US008582624B2

(12) United States Patent
Jonsson et al.

(10) Patent No.: US 8,582,624 B2
(45) Date of Patent: Nov. 12, 2013

(54) METHOD AND APPARATUS FOR ENHANCING THE ACCURACY OF THE ESTIMATED COVARIANCE MATRIX IN WIDEBAND-CDMA SYSTEMS

(75) Inventors: Elias Jonsson, Malmö (SE); Yoshitaka Murata, Yokohama (JP); Jaroslaw Niewczas, Jozefow (PL); Amit Singh, Lund (SE); Kazuyoshi Uesaka, Kawasaki (JP)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 408 days.

(21) Appl. No.: 12/976,519

(22) Filed: Dec. 22, 2010

(65) Prior Publication Data

US 2012/0082197 A1     Apr. 5, 2012

Related U.S. Application Data

(60) Provisional application No. 61/388,756, filed on Oct. 1, 2010.

(51) Int. Cl.
*H04B 1/10* (2006.01)

(52) U.S. Cl.
USPC ............... 375/148; 375/246; 375/E1.02

(58) Field of Classification Search
USPC ............... 375/148, 150, 224, 316, 346
See application file for complete search history.

(56) References Cited

U.S. PATENT DOCUMENTS

| | | | |
|---|---|---|---|
| 6,714,585 B1 | 3/2004 | Wang et al. | |
| 2004/0057502 A1 | 3/2004 | Azenkot et al. | |
| 2006/0079221 A1* | 4/2006 | Grant et al. | 455/423 |
| 2006/0182204 A1* | 8/2006 | Cairns et al. | 375/340 |
| 2008/0130719 A1 | 6/2008 | Bottomley et al. | |
| 2008/0304554 A1 | 12/2008 | Fulghum et al. | |
| 2008/0304586 A1* | 12/2008 | Molnar | 375/260 |
| 2009/0116568 A1* | 5/2009 | Lindoff et al. | 375/260 |
| 2009/0213910 A1 | 8/2009 | Grant | |
| 2009/0310715 A1 | 12/2009 | Cairns et al. | |

FOREIGN PATENT DOCUMENTS

| | | |
|---|---|---|
| WO | 2008/154464 A2 | 12/2008 |
| WO | 2009025611 A2 | 2/2009 |

OTHER PUBLICATIONS

Dahlman, E. et al. "Chapter 3: High Data Rates in Mobile Communication." 3G Evolution: HSPA and LTE for Mobile Broadband. Elsevier, Oxford, UK, 2007, pp. 31-43.

(Continued)

*Primary Examiner* — Shuwang Liu
*Assistant Examiner* — David Huang
(74) *Attorney, Agent, or Firm* — Coats and Bennett, P.L.L.C.

(57) ABSTRACT

A set of channelization codes to be monitored is divided into two groups. The first group includes those codes for which an associated symbol modulation and transmit-diversity scheme is known. In the second group are those codes that are characterized by an unknown symbol modulation or unknown transmit-diversity scheme. The quality of the transmission of each code is then evaluated, using a metric. The metric in turn is used to determine whether the code should be used in estimating the covariance matrix by correlating the RAKE data corresponding to the code (i.e., by computing a correlation matrix for the code) or by first subtracting the channel estimates from the channel samples before correlation (i.e., by computing a covariance matrix for the code). An impairment covariance matrix is computed from the covariance matrices and correlation matrices so computed.

27 Claims, 4 Drawing Sheets

(56) References Cited

OTHER PUBLICATIONS

Dahlman, E. et al. "Chapter 9: High-Speed Downlink Packet Access." 3G Evolution: HSPA and LTE for Mobile Broadband. Elsevier, Oxford, UK, 2007, pp. 141-184.

Bottomley, G. E. et al. "A Generalized RAKE Receiver for Interference Suppression." IEEE Journal on Selected Areas in Communications, vol. 18, No. 8, Aug. 2000.

3rd Generation Partnership Project. 3GPP TS 23.271, V9.4.0 (Jun. 2010). 3rd Generation Partnership Project; Technical Specification Group Services and Systems Aspects; Functional stage 2 description of Location Services (LCS) (Release 9). Jun. 2010.

3rd Generation Partnership Project. 3GPP TS 25.212, V8.5.0 (Mar. 2009). 3rd Generation Partnership Project; Technical Specification Group Radio Access Network; Multiplexing and channel coding (FDD) (Release 8). Mar. 2009.

3rd Generation Partnership Project. 3GPP TS 25.211, V8.4.0 (Mar. 2009). 3rd Generation Partnership Project; Technical Specification Group Radio Access Network; Physical channels and mapping of transport channels onto physical channels (FDD) (Release 8). Mar. 2009.

3rd Generation Partnership Project. 3GPP TS 25.101, V6.12.0 (Jun. 2006). 3rd Generation Partnership Project; Technical Specification Group Radio Access Network; User Equipment (UE) radio transmission and reception (FDD) (Release 6). Jun. 2006.

3rd Generation Partnership Project. 3GPP TS 25.101, V8.10.0 (Mar. 2010). 3rd Generation Partnership Project; Technical Specification Group Radio Access Network; User Equipment (UE) radio transmission and reception (FDD) (Release 8). Mar. 2010.

* cited by examiner

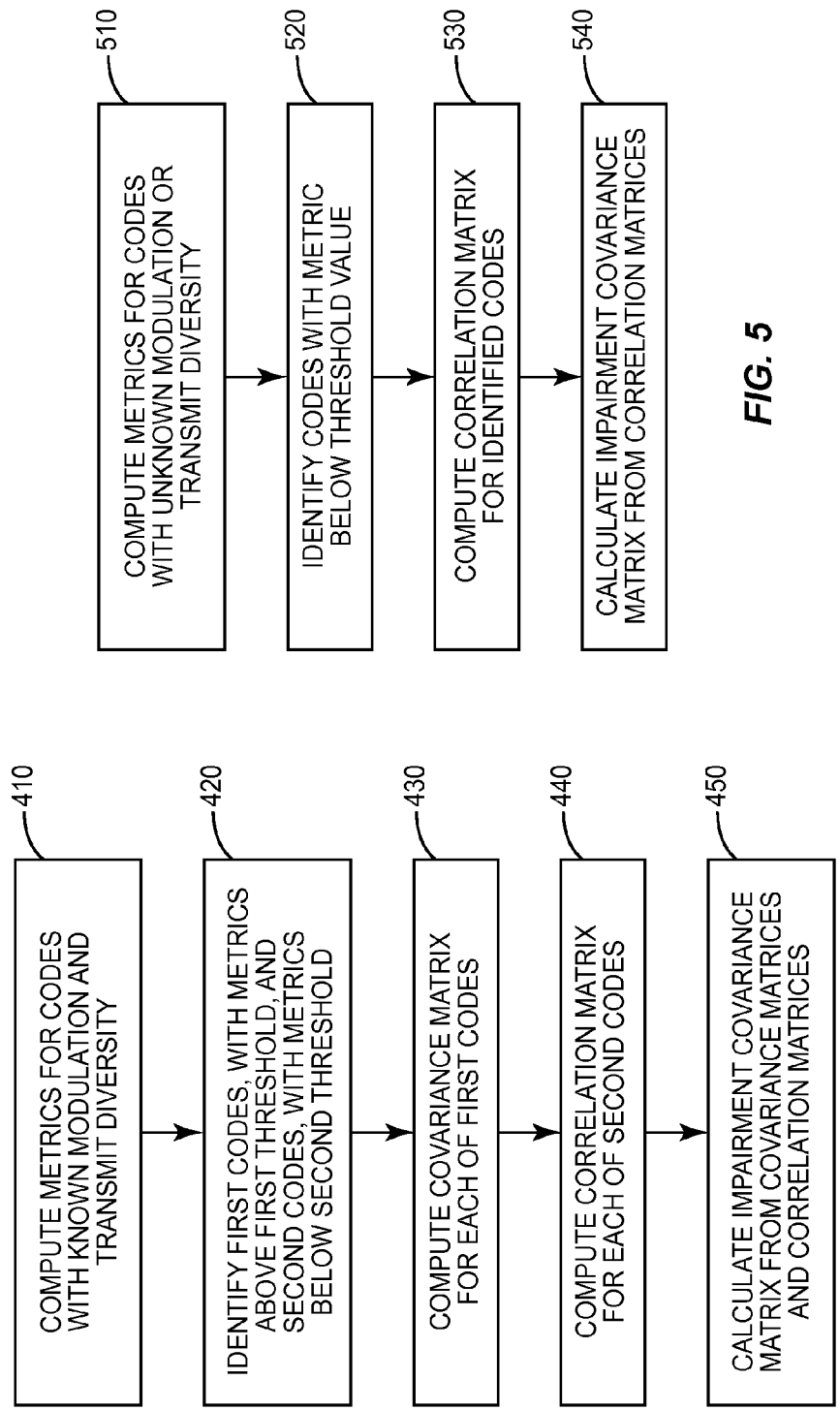

US 8,582,624 B2

METHOD AND APPARATUS FOR ENHANCING THE ACCURACY OF THE ESTIMATED COVARIANCE MATRIX IN WIDEBAND-CDMA SYSTEMS

RELATED APPLICATION

This application claims priority under 35 U.S.C. §119(e) to U.S. Provisional Patent Application Ser. No. 61/388,756, filed 1 Oct. 2010 and titled "Method for enhancing the accuracy of the estimated covariance matrix in WCDMA." The entire contents of the foregoing provisional application are incorporated herein by reference.

BACKGROUND

The present invention generally relates to wireless communication devices, and particularly relates to suppressing interference from a received signal using combining weights derived from impairment covariance estimates.

Direct Sequence Code Division Multiple Access (DS-CDMA) systems use two different codes for separating devices and/or channels when transmitting data. Scrambling codes are pseudo-noise sequences used to separate base stations, cells or sectors from each other in the downlink. In the uplink, scrambling codes separate users. Channelization codes are orthogonal sequences used to separate different channels in a particular cell or sector in the downlink or to separate different parallel streams of data intended for one user in either the uplink or downlink. As such, channelization codes channelize user-specific data onto respective channels and scrambling codes scramble the channelized data.

Multipath fading causes loss of orthogonality between different channelization codes, thus causing signal interference. This interference can be self-interference (e.g., between codes assigned to the same user) as well as inter-user-interference. Signal interference limits performance in DS-CDMA systems such as Wideband-CDMA (W-CDMA), High Speed Downlink Packet Access (HSDPA), CDMA2000 and 1XEV-DO systems. Particularly, capacity and high data-rate coverage are adversely affected. Signal interference may be self-induced where other desired symbols sent in parallel (multicode) or in series (previous, next symbols) interfere with a symbol of interest. Other-user symbols also cause interference and may be sent from the same base station (own-cell interference) or from a different base station (other-cell interference).

Conventional wireless receivers account for impairment (interference and noise) correlations between interfering signals and a signal of interest when processing a received signal. Accounting for impairment correlations enables a receiver to better suppress interference from a received signal, thus improving performance. For example, in a Generalized RAKE (G-RAKE) receiver, some signal processing "fingers" are placed on signal path delays of a multipath fading channel for optimizing signal energy collection while other fingers are placed off signal path delays to suppress interference. Finger outputs are combined to form symbol estimates by weighting each component based on impairment correlations.

That is, G-RAKE receivers suppress interference by optimally combining components of a received signal based on impairment correlations. The combining weights may also be used to estimate received signal quality, e.g., by calculating a Signal-to-Interference Ratio (SIR). (The same or similar signal quality measures are sometimes referred to as Signal-to-Interference-plus-Noise Ratios, or SINRs) SIR information is provided to the corresponding base station for use in optimizing radio resources, e.g., by adjusting the power allocated to different channelization codes.

G-RAKE combining weights and SIR estimates are derived from channel response and impairment correlation estimates. Channel response and impairment correlation estimates are ascertained at least in part from demodulated and de-spread pilot symbols transmitted over a common channel (e.g., the Common Pilot Channel, or CPICH, in Wideband-CDMA systems). In a parametric estimation approach to the impairment correlation estimation process, interference and noise powers are estimated by fitting interference and noise correlation terms of a parametric model of the impairment to a pilot symbol-based measured impairment. In non-parametric approaches, estimates of the impairment are calculated directly from pilot-based measurements.

The result of either impairment estimation process is a covariance matrix, conventionally denoted R, the elements of which represent the covariance between any pair of fingers in the G-RAKE receiver (or, equivalently, between any pair of taps in a chip-equalizer receiver). Accordingly, in a typical W-CDMA time-domain equalizer, the combining weights used to form the de-spread symbols from the RAKE fingers can be written as:

$$w = R^{-1}h, \qquad (1)$$

where h are the net channel estimates (propagation channel convolved with the responses of the receiver and transmit filters). Here h is a column vector, and each entry represents a path delay or finger used in the demodulation.

Each element in, corresponding to fingers $f_1$ and $f_1$ in the covariance matrix, can be computed by correlating samples of the type $(h_{f_1,s} - h_{f_1})(h_{f_2,s} - h_{f_2})$, and averaging over a sufficient amount of time. Here, $h_{f_1,s}$ is the sample observed directly from the channel, that is, before filtering or "de-noising," while $h_{f_1}$ is a corresponding de-noised channel estimate. If the physical channel used to compute $h_{f_1}$ is of zero power, then the above expression reduces to $h_{f_1,s}(h_{f_2,s})^*$. More details of this process are given in G. Bottomley, et al., "A generalized RAKE receiver for interference suppression," IEEE Journal on Selected Areas of Communication, Vol. 18, no. 8, August 2000, and in U.S. Pat. No. 6,714,585, issued Mar. 30, 2004 and titled "RAKE Combining Methods and Apparatus using Weighting Factors Derived from Knowledge of Spreading Spectrum Signal Characteristics," the entire contents of which are incorporated by reference herein.

Typically, the samples $h_{f,s}$ are estimated based only on the Common Pilot Channel (CPICH). A general problem with this type of equalizer is that the amount of noise in the matrix elements of R may be quite high. In particular, a drawback with the standard method of estimating the samples. $h_{f_1,s}$, based on the CPICH is that the once the number of fingers used in the demodulation becomes large (e.g., 20 or more) the noise in R becomes so large that the use of additional fingers does not improve receiver performance.

SUMMARY

In several embodiments of the invention, a set of channelization codes to be monitored is divided into two groups. The first group includes those codes for which an associated symbol modulation and transmit-diversity scheme is known. In the second group are those codes that are characterized by an unknown symbol modulation or unknown transmit-diversity scheme. The quality of the transmission of each code is then evaluated, using a metric. The metric in turn is used to determine whether the code should be used in estimating the covariance matrix by correlating the RAKE data corresponding to the code (i.e., by computing a correlation matrix for the code) or by first subtracting the channel estimates from the channel samples before correlation (i.e., by computing a covariance matrix for the code).

One aspect of this approach involves how to detect and utilize codes with either known or empty contents for impairment estimation purposes. The subject receiver could use a chip equalizer, or a GRAKE, or frequency domain methods, in various embodiments.

Example processes that use one or several types of codes (in addition to the pilot channel) for estimating impairments are described below. In particular, one process addresses only those codes associated with known (or likely to be known) modulation schemes. This process distinguishes between those codes for which symbols can be reliably demodulation and those codes that are apparently unused. A covariance matrix is computed for those in the former category, while a correlation matrix is computed for those in the latter. Other processes focus only on codes associated with an unknown modulation scheme and/or unknown transmit-diversity scheme, and determine that a code is unused. In these process, only unused codes are added to the impairment estimation process. Combinations of these processes are also described.

One example method for estimating impairment-related parameters of a received radio signal that includes a sequence of transmitted symbols, which may be implemented in a receiver having a plurality of processing-delay elements, such as a RAKE receiver (having a plurality of de-spreading "fingers") or a linear chip equalizer (having a plurality of delay taps), begins with the computing of a quality metric, from samples of the received radio signal, for each of several codes for which an associated modulation scheme and an associated transmit diversity scheme (if any) are known. This group of codes is processed in addition to processing a common pilot.

The quality metric may be of any of several different types, including metrics based on symbol amplitudes or metrics based on an estimated signal-to-interference ratio (SIR) for the code. In some embodiments the metric calculation is based on detected symbol values, which may be based on so-called "hard decisions," while in others a series of demodulated soft symbol values may be decoded, using a Viterbi or Turbo decoder, for example, before computing a SIR-based metric.

In some embodiments, the quality metric for each channelization code is computed by obtaining combined symbol values from the received radio signal, using the channelization code, the known transmit-diversity scheme, if any, and a predetermined set of combining weights applied to de-spread symbol values from the processing-delay elements, and calculating the quality metric as a function of the combined symbol values. The predetermined set of combining weights may be derived in a number of ways, and may comprise weights obtained from a previous estimation of impairment based on a common pilot channel alone, or weights obtained from a previous iteration of impairment estimation based on one or more channelization codes other than the pilot code, or weights obtained from a previous estimation of impairment from a prior transmission time interval.

In some cases, the quality metric is based on the sum of the amplitudes of the combined symbols scaled by a scaling factor dependent on a spreading factor for the channelization code. In other embodiments, the quality metric is based on the ratio of an intermediate metric based on the amplitudes of the combined symbols to a corresponding metric for a common pilot channel. In still other embodiments, the contribution of a given code to the overall signal is evaluated. In some of these embodiments, the quality metric comprises the ratio of a metric based on the amplitudes of the combined symbols to the sum of corresponding metrics for all evaluated channelization codes.

As an alternative to these amplitude-based metrics, an SIR-based metric may be used, in some embodiments. In some of these embodiments, computing the quality metric further involves detecting discrete symbol values from the combined symbol values, using the known modulation scheme and one or more hard-decision thresholds, and computing code-specific per-delay channel estimates based on the discrete symbol values and per-delay symbol values for the channelization code. The quality metric can then be calculated as a function of a signal-to-interference ratio computed from the code-specific per-delay channel estimates. In some embodiments, the signal-to-interference ratio is computed from the code-specific channel estimates and preliminary combining weights used to form the combined symbol values. As an alternative to detection by hard-decisions, some embodiments may detect symbol values by applying a convolutional or Turbo decoding process to the combined de-spread symbol values. In these embodiments, then, computing a quality metric requires decoding a sequence of the combined symbol values, according to the known modulation scheme and a pre-determined error-correction code, to obtain decoded symbol values, re-encoding the decoded symbol values to obtain re-encoded symbol values, and computing code-specific per-delay channel estimates based on the re-encoded symbol values and per-delay symbol values for the channelization code. The quality metric can then be calculated as a function of a signal-to-interference ratio computed from the code-specific channel estimates.

Whatever quality metric is used, the example method continues with determining that at least one of the channelization codes has a quality metric higher than a first threshold value and that at least one of the channelization codes has a quality metric lower than a second threshold value. The first and second threshold values may be the same, in some embodiments, but may differ in others. In the latter case, the first threshold value is typically higher than the second threshold value, allowing for a "gray zone" of codes for which it appears that there is enough energy present to suggest that the code is used, but for which there is insufficient energy to reliably decode the symbols and use those symbols as "quasi-pilot" symbols. A covariance matrix is computed for each of the channelization codes having a quality metric higher than the first threshold value, using per-delay channel estimates calculated from per-delay de-spread symbol values at two or more processing delays and quasi-pilot symbol values obtained from combined per-delay de-spread symbol values. Likewise, a correlation matrix is computed for each of the channelization codes having a quality metric lower than the second threshold value, where each of the correlation matrices is computed directly from per-delay de-spread symbol values at two or more processing delays. Finally, an impairment covariance matrix for the received radio signal is calculated from the covariance matrices and correlation matrices, e.g., as a weighted sum of the covariance matrices and correlation matrices. As discussed earlier, this impairment covariance matrix includes information obtained from observing the pilot symbols, but has reduced noise compared to an impairment covariance matrix computed only from pilot symbol observations.

Another example process for estimating impairment-related parameters of a received radio signal that includes a sequence of transmitted symbols begins with the computing of a quality metric, from samples of the received radio signal, for each of a group of channelization codes for which either or both of an associated modulation scheme and associated transmit diversity scheme, if any, are not known. The quality metric may be any of several types, including those based on combined de-spread symbol amplitudes, described above.

This example method continues with determining that at least one of the channelization codes has a quality metric lower than a threshold value. A correlation matrix is computed for each of the channelization codes having a quality metric lower than the threshold value, where each of the correlation matrices is computed directly from per-delay de-spread symbol values at two or more processing delays. Finally, an impairment covariance matrix for the received radio signal is calculated from the computed correlation matrices, e.g., as a weighted sum of the correlation matrices In some of these embodiments, each of several possible transmit-diversity schemes is tested during the computation of the quality metric. In some of these embodiments, a tentative quality metric corresponding to each of several candidate transmit diversity schemes is calculated by generating combined de-spread symbol values, using each candidate transmit diversity scheme and the plurality of processing-delay elements, and computing the tentative quality metric corresponding to each candidate transmit diversity scheme from the combined de-spread symbol values. In some of these embodiments, the tentative quality metric having the highest value is deemed to be the quality metric for the corresponding channelization code.

The techniques summarized above can be implemented in any of several types of receivers, including RAKE receivers and chip equalizer receivers. Typically, these techniques will be performed at least in part using one or more microprocessors, microcontrollers, and the like, executing stored program code comprising instructions for carrying out one or more of the described methods. Of course, parts of a receiver configured according to these techniques, such as the RAKE fingers and chip-equalizer portions, may also be implemented using digital logic or other customized hardware. Accordingly, embodiments of the present invention include wireless communication devices, such as a mobile phone or Local Area Network (LAN) adapter, comprising circuitry configured to receive a signal using a plurality of delay-processing elements. These devices also comprise a baseband processor which is configured to carry out one or more of the techniques summarized above, or variants thereof.

Of course, the present invention is not limited to the above features and advantages. Those skilled in the art will recognize additional features and advantages upon reading the following detailed description, and upon viewing the accompanying drawings.

BRIEF DESCRIPTION OF THE DRAWINGS

FIG. 4 is a processing flow diagram illustrating another method for estimating impairments in a wireless device.

FIG. 5 is a processing flow diagram illustrating still another method for estimating impairments in a wireless device.

DETAILED DESCRIPTION

Figure 1:
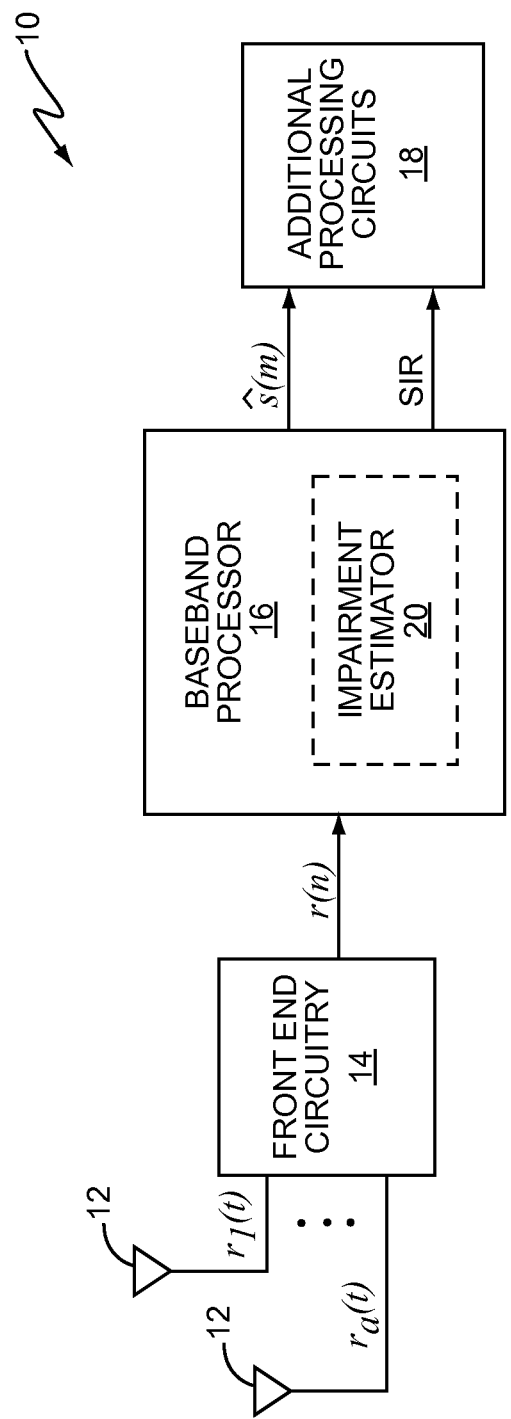
FIG. 1 is a block diagram of one embodiment of a wireless communication device having a baseband processor that estimates impairment covariance.

FIG. 1 illustrates an embodiment of a wireless communication device 10, such as a mobile phone or a wireless Local Area Network (LAN) adapter. The device 10 receives and processes signals transmitted in conformance with a DS-CDMA multiplexing scheme such as W-CDMA, HSDPA, CDMA2000, 1XEV-DO, etc. The device 10 comprises one or more antennas 12, front-end circuitry 14, a baseband processor 16 and additional processing circuits 18. Each antenna 12 receives a composite signal $r_a(t)$ that includes various signal components segregated by different channelization codes. For example, a given transmitter transmits a plurality of control and information signals in the composite signal, using a set of orthogonal channelization codes to separate each signal. In theory, such channelization allows the corresponding channelization code to be used at a receiver to extract any signal of interest from the received composite signal, free of interference from the other signals. However, multipath fading at least partially spoils channelization code orthogonality, resulting in at least some interference from the other signals.

Various types of receivers have been developed to reduce the impacts of multipath fading and other sources of impairments to the received signal. Several of these receivers are based on interference-suppressing combining weights that are calculated based on an estimate of the time-varying impairments. Several embodiments of the techniques presented herein focus on improving interference cancellation by reducing the noise in the impairment estimation process, specifically by using several physical channels, in addition to the CPICH, to generate the covariance matrix R. More particularly, the following disclosure describes how to detect whether the received data associated with a given spreading code is of enough quality so as to be used as an additional type of "pilot" channel, i.e., a "pseudo-pilot" channel. Additionally combining information obtaining from these quasi-pilot channels, the impairment estimation process improves the accuracy of the estimation as compared to an estimate based only on pilot channel observations. In several embodiments of the invention, this is performed by first separating a set of monitored spreading codes into two categories, one in which it has been determined that the symbols may be reliably decoded and a second one where this is known to be impossible, or at least quite difficult. Different strategies are applied to members of each of these two categories to estimate the covariance matrix.

Referring back to FIG. 1, in several embodiments of the present invention, a baseband processor 16 functions as a generalized RAKE (G-RAKE) receiver, while in others the baseband processor 16 functions as a linear equalizer. However, regardless of baseband configuration, an estimate of impairments (e.g., a covariance matrix R) is formulated, and used to calculate combining weights for producing de-spread symbol values ŝ(m) (soft symbols). In the receiver pictured in FIG. 1, the de-spread symbol values ŝ(m) are further processed in additional processing circuits 18, where the symbol values may be de-mapped against a pre-determined constellation pattern and/or decoded using a convolutional or Turbo decoder.

Figure 2:
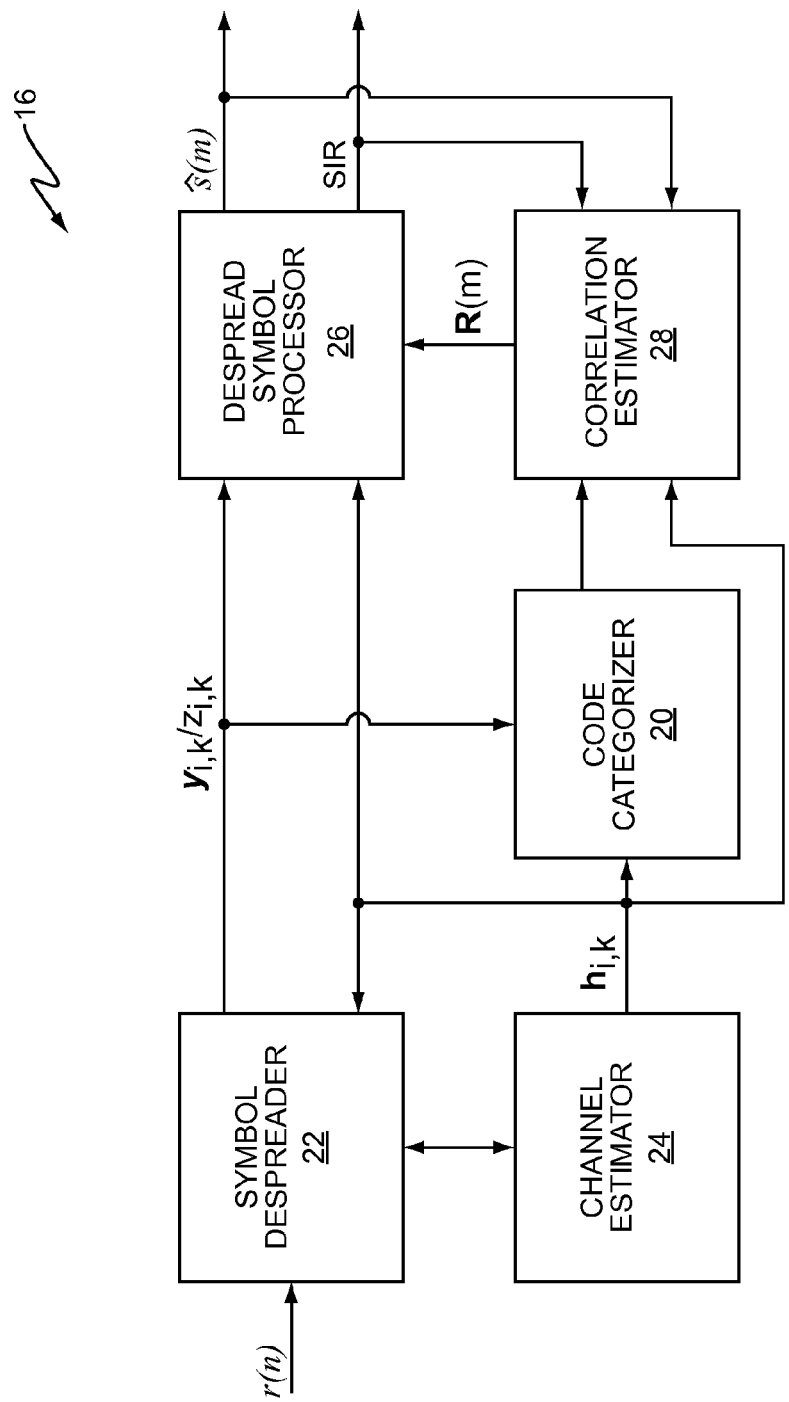
FIG. 2 is a block diagram of one embodiment of the baseband processor included in the wireless communication device of FIG. 1.

With this in mind, FIG. 2 illustrates one embodiment of a baseband processor 16, which may be implemented for example, using one or more microprocessors, microcontrollers, digital signal processors (DSPs), or the like, configured with appropriate software comprising program instructions for carrying out the techniques descried below. Baseband processor 16 may also be configured using special-purpose digital logic, such as in an application-specific integrated circuit (ASIC), alone or in combination with one or more programmed microprocessors, microcontrollers, or DSPs.

In any case, a symbol de-spreader 22 demodulates and de-spreads a baseband signal r(n). The baseband signal comprises various signal components separated by different channelization codes as previously described. One component corresponds to a symbol of interest while the remaining components correspond to interfering symbols. The interfering symbols may be other desired symbols sent in parallel (multicode) or in series (previous, next symbols) that interfere with the symbol of interest or other-user symbols (own-cell and/or other cell). The channelization codes associated with the symbol of interest and interfering symbols may have different power levels. The baseband processor 16 estimates the impairments to the symbol of interest arising from the interfering symbols, and uses these estimates to improve received signal processing.

In more detail, a channel estimator 24 generates a common medium response estimate $g_i$ and a code-specific channel response estimate $h_{i,k}$ for the $k^{th}$ channelization code at the $i^{th}$ symbol period, based on de-spread pilot symbols provided by the symbol de-spreader 22 and spreading codes as is well understood in the art.

A de-spread symbol processor 26 yields soft symbol estimates ŝ(m) or received signal quality estimates (e.g., signal-to-interference ratio, or SIR) by appropriately weighting and combining either de-spread symbol values or RAKE combined values where m refers to a particular symbol being de-spread. De-spread symbol values and RAKE combined values are weighted based on an impairment covariance matrix R(m) and the code-specific channel response estimate $h_{i,k}$. A correlation estimator 28 generates the impairment correlation matrix R(m), using a plurality of codes selected by code categorizer 20. Using one or more techniques described in detail below, correlation estimator 28 calculates an improved impairment covariance matrix R(m), based not only on pilot channel observations, but also one or more codes corresponding to transmitted data for which the modulation and transmit-diversity mode are known, and/or or more codes that are determined to be unused.

Given an impairment covariance matrix R(m), the de-spread symbol processor 26 generates de-spread symbol combing weights was given by:

$$w_m = R^{-1}(m) h_{i(m),k(m),m} \quad (2)$$

The de-spread symbol processor 26 combines different de-spread symbols $y_{i,k}$ using the combining weights to form soft symbol estimates. The de-spread symbol processor 26 also uses the combining weights to generate SIRs as given by:

$$SIR = h_{i(m),k(m),m}^H R^{-1}(m) h_{i(m),k(m),m} = w_m^H h_{i(m),k(m),m} \quad (3)$$

As noted above, conventional approaches to estimating the covariance matrix R suffer from excess noise, particularly when the number of processing delays (i.e., fingers or equalizer taps) is large. This noise can be reduced by using additional information obtained by monitoring codes (i.e., CDMA channels) other than the tailored pilot channel, such as the CPICH.

In various embodiments of the invention, the set of codes that are monitored is divided into two groups. The first group includes those codes for which an associated symbol modulation and transmit-diversity scheme (Txdiv) is known. In the second group are those codes that are characterized by an unknown symbol modulation or unknown transmit-diversity scheme. The quality of the transmission of each code is then evaluated, using a metric. The metric in turn is used to determine whether the code should be used in estimating the covariance matrix by correlating the RAKE data corresponding to the code (i.e., by computing a correlation matrix for the code) or by first subtracting the channel estimates from the channel samples before correlation (i.e., by computing a covariance matrix for the code).

One aspect of this approach involves how to detect and utilize codes with either known or empty contents for impairment estimation purposes. The receiver structure where those estimates are applied is not so important. Thus, the subject receiver could use a chip equalizer, or a GRAKE, or frequency domain methods, for example.

Figure 3:
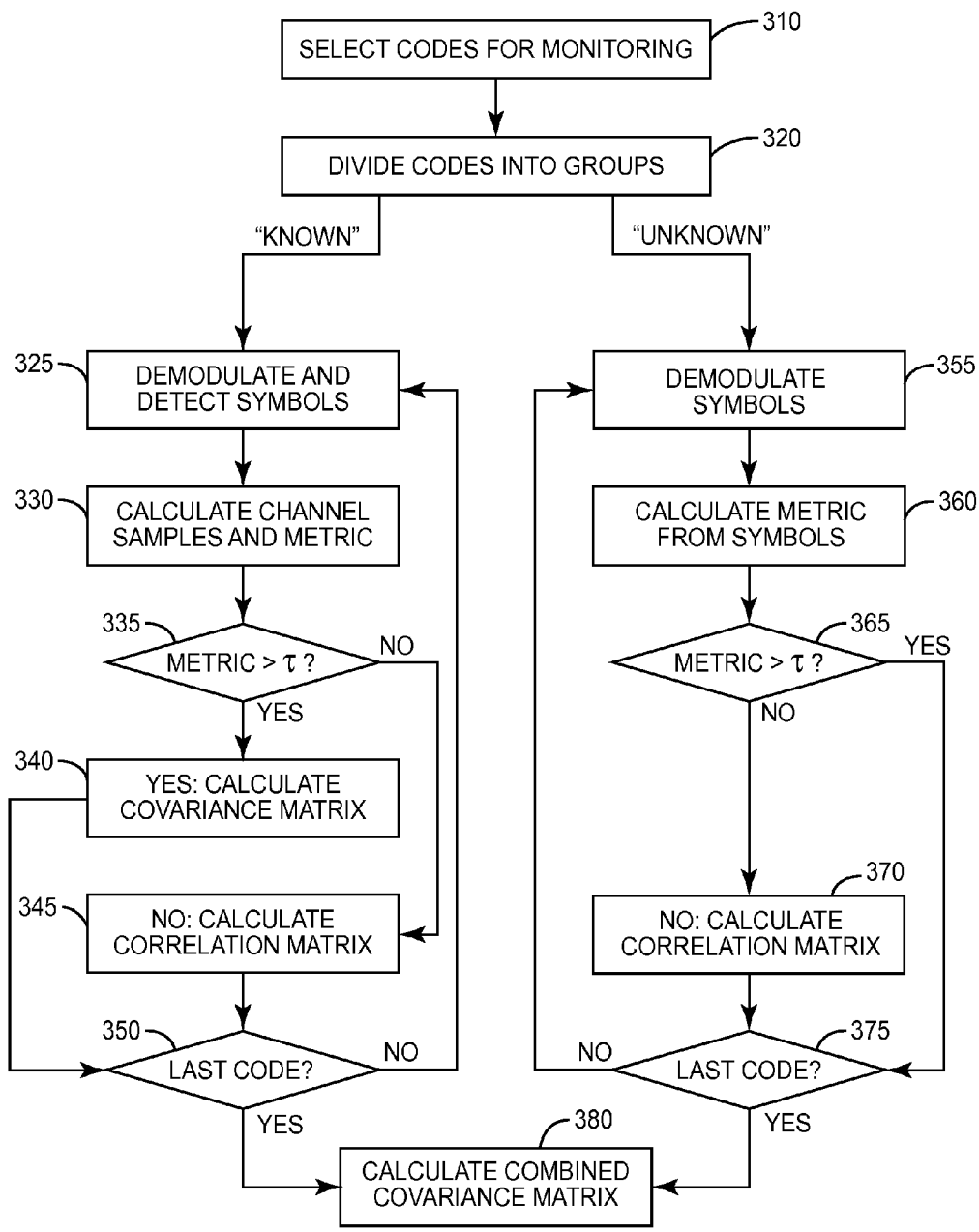
FIG. 3 is a processing flow diagram illustrating a method for estimating impairments in a wireless device.

In FIG. 3, a process flow diagram applicable to several embodiments of the invention is provided. Details of the operations associated with each of the illustrated blocks follow. As an initial matter, it should be noted that while the following discussion describes the application of several operations to a "time slot," which has an understood meaning in W-CDMA systems and other systems, this is not intended to limit the application of these operations to only a single time slot at a time. The same approach may be applied to any of various time intervals, whether more or less than a single slot.

The illustrated process begins, as shown at block 310, with the selection of a set of spreading codes to be monitored. This set of spreading codes to be monitored could take many shapes. For example, the set could include a pre-determined set of preferred channels to monitor, including, for example, control channels such as P-CCPCH, HS-SCCH, AGCH, PICH in WCDMA systems. One reason that these codes may be especially advantageous for monitoring is that they each correspond to physical channels in which the power is constant over an entire slot, with the exception of the first symbol per slot of P-CCPCH. The set of codes to be monitored could also include codes allocated to the High-Speed Physical Downlink Shared Channel (HS-PDSCH) in High-Speed Packet Access (HSPA) systems.

Another category of codes that might be included in the set of codes to be monitored is a set of spreading codes that are known to be empty quite often. This information could be obtained by measurements from different vendors' base stations, for example. In its most generalized form, this category might be considered to include all codes. In a system that dynamically selects the set of codes to be monitored (as compared to using a pre-determined set that is pre-installed in a device or signaled to the device), a code might be included in the category of usually empty codes only until it is determined that the code is used one or more times, at which point it is removed from that category.

Other channels that might be monitored include control channels whose power may be constant if there is zero or one user allocated, such as AICH/E-RGCH/E-HICH. Other channels to consider include S-CCPCH, DPCH, for WCDMA systems.

It will be appreciated that if the monitoring mobile station (user equipment, or UE, in 3GPP terminology) has enough de-spreaders (i.e., processing delay elements, whether fingers in a G-RAKE receiver or equalizer taps in a chip equalizer receiver), then all monitored codes can be assumed to be measured upon over time. On the other hand, if the mobile station has limited de-spreader resources, it might instead use a dynamic scheme that rotates through the different set of codes in the monitored set and, after some initial transient period wherein the most promising codes are identified, spends most of the monitoring time on those codes that feature low transmit power or very high transmit power, thus avoiding the gray zone of medium transmit power. Of course, since the environment may change over time, the mobile station will occasionally, perhaps periodically, have to measure on codes not favored as the best ones. Such a dynamic scheme may be selectively enabled or disabled, in various embodiments. For instance, if the mobile station determines that it wants to prioritize power consumption, the feature may be turned off.

Next, as shown at block 320, the set of spreading codes to be monitored is divided into two groups. The first group contains codes for which the modulation scheme and transmit-diversity scheme are known. The second group contains the remaining codes. Examples of the codes that may be in the first group include those used for control channels such as P-CCPCH, HS-SCCH, AGCH, PICH. The first group might also include HS-PDSCH, especially for lower order modulation, such as QPSK. The set of spreading codes known to be empty quite often might be included by default in the second group. As noted earlier, this information could be obtained by measurements from different vendors' base-stations.

The handling of the codes for impairment estimation purposes varies, depending on whether they belong to the first group or the second group, i.e., the group of codes having a "known" modulation and transmit-diversity or the group of codes having an "unknown" modulation and/or transmit-diversity. The left-hand side of FIG. 3 illustrates an example process for codes in the first group, while the right-hand side illustrates a corresponding process for the second group.

The process applied to codes in the first group, i.e., those codes for which the associated modulation and transmit-diversity schemes are known, begins with demodulating symbols for that code, using the known transmit-diversity scheme and using a preliminary set of combining weights. This is shown in FIG. 3 at block 325. Note that in the discussion that follows, the notation "CCH" will refer to a specific physical channel or code.

The received symbols for a given code (CCH) in the first group are demodulated as:

$$\tilde{s}^{CCH}(i) = \sum_{f=0}^{N_f-1} (w_f^{CCH}(i))^* g_f^{CCH}(i), \quad (4)$$

where $w_f^{CCH}(i)$ are combiner weights corresponding in time to the symbol to be demodulated, $N_f$ is the number of fingers of the Rake receiver (or taps in a chip equalizer) used in the demodulation process, and $g_f$ is RAKE/equalizer symbol output (in this case corresponding to a code CCH) for finger/tap number f.

Several ways exist to select these preliminary weights. For example, they could be based on CPICH measurements only (that is, calculated from an impairment matrix that is only based on CPICH) or based on an earlier iteration of the method in embodiments in which the method is repeated to enhance its accuracy. Alternatively, for example if computational power is limited, equalizer weights derived for an earlier time interval, e.g., for the HS-PDSCH, may be used.

The estimated symbols derived according to Equation (4) are "soft" symbols. The next step is to perform the hard decision of combined symbols. As a non-limiting example, the mathematics is shown for QPSK modulation. In this case, the hard symbol values can be determined as:

$$p^{CCH}(i) = \begin{cases} 1+j, & \text{if } \tilde{s}^{CCH}(i) \text{ is located in the first quadrant} \\ -1+j, & \text{if } \tilde{s}^{CCH}(i) \text{ is located in the second quadrant} \\ -1-j, & \text{if } \tilde{s}^{CCH}(i) \text{ is located in the third quadrant} \\ 1-j, & \text{if } \tilde{s}^{CCH}(i) \text{ is located in the fourth quadrant} \end{cases} \quad (5)$$

In a refinement of the above approach, only the samples $\tilde{s}^{CCH}(i)$ whose phases are within a certain angular range of the reference points $\pm 1 \pm i$ are considered, while other samples are dropped.

As an alternative to hard-decoding, if the time unit (e.g., a time slot) is long enough, one could, instead of taking hard decisions to get quasi-pilots, decode the channel (e.g., with a Viterbi or Turbo decoder) and then re-encode the decoded values it to get the symbols that may have been transmitted over the air.

Next, as shown at block 330, channel samples and channel estimates are computed, and a quality metric is calculated therefrom. Channel samples can be calculated as follows:

$$\hat{h}_f^{CCH}(i) = w_{SF} g_f^{CCH}(i) \cdot (p^{CCH}(i))^*, i=0 \ldots N_S-1, \quad (6)$$

where $w_{SF}$ is a scaling factor that depends on the spreading factor of the code. The number of symbols in a slot, $N_S$, depends on the spreading factor of the code. If, for example, the channel is given by P-CCPCH, $N_S=10$ because the spreading factor SF=256. If the channel is HS-SCCH, $N_S=20$ because SF=128.

Channel estimates are obtained by averaging the per-finger channel estimates over samples for the involved code or codes, or physical channels. For example, $$h_f^{P-CCPCH} = \frac{1}{9} \sum_{i=1}^{9} \hat{h}_f^{P-CCPCH}(i), \quad (7)$$

and $$h_f^{HS-SCCH} = \frac{1}{20} \sum_{i=0}^{19} \hat{h}_f^{HS-SCCH}(i). \quad (8)$$

The first symbol in P-CCPCH (Primary Common Control Physical Channel, in WCDMA systems) is skipped, as shown in Equation (7), because the base station does not transmit the first symbol since it is used for SCH transmission. Thus, only nine of the ten symbols in a slot are used (symbols 1 to 9, skipping symbol 0), and the scaling thus accounts for nine symbols ($1/(N_S-1)$ rather than ten. In contrast, Equation (8), which corresponds to the High-Speed Shared Control Channel in High-Speed Packet Access (HSPA) systems, uses all twenty symbols in a slot (symbols 0 to 19), and the scaling factor likewise accounts for all twenty ($1/N_S=1/20$).

Finally, a metric that will be used to determine whether the code under consideration is used is calculated. This metric can be calculated in many ways. One example is a metric based on a signal-to-interference ratio (SIR). Another example is a metric based on amplitudes of the detected symbols.

An SIR-based metric requires calculating the SIR for the channel, and either using that SIR directly or scaling with CPICH SIR as a metric. The decision can be performed using the SIR per channel/code, that is:

$$SIR_{CCH} = \sum_{f=0}^{N_f} Re[(w_f^{CCH})^* h_f^{CCH}]. \qquad (9)$$

Note that $w^{CCH}$ and $h^{CCH}$ are column vectors of $w_f^{CCH}$ and $h_f^{CCH}$, respectively. The SIR calculated in Equation (9) can be used as a metric directly, in some embodiments. In other cases, the SIR can be normalized to the SIR for the pilot channel, e.g.:

$$M^{CCH} = \frac{SIR_{CCH}}{SIR_{CPICH}}. \qquad (10)$$

Three different examples of amplitude-based metrics are shown below:

$$m^{CCH} = \frac{256}{SF_{CCH}} \sum_{i \in N_{valid}} |\tilde{s}^{CHH}(i)|. \qquad (11)$$

$$M^{CCH} = \frac{m^{CCH}}{m^{CPICH}}. \qquad (12)$$

$$\tilde{M}^{CCH} = \frac{m^{CCH}}{\sum_{\text{Sum over all involved codes}} m^{CCH}} \qquad (13)$$

Note that $N_{valid}$ is the set of the usable symbols transmitted from the base station. For example, $N_{valid} = \{1, 2, \ldots, 9\}$ for P-CCPCH, given a one-slot measurement interval.

The first metric, $m^{CCH}$, given in Equation (11), measures the power of the observed code. In some embodiments, this metric may be used directly. In other embodiments, the second metric, $M^{CCH}$ compares the power of the observed code to the power of the CPICH, is used instead. The third metric, $\tilde{M}^{CCH}$, given in Equation (13), computes the contribution of the observed code to the total observed power. Thus, it computes a ratio of the code power for the subject to the sum of all observed powers.

As shown at block 335, the metric is then compared to a threshold $\tau$ to determine whether the code in question is used or not. For example, if a SIR-based metric is used, then if $SIR_{CCH} > \tau$ or $M^{CCH} > \tau$, the code is considered to be used. If not, the code is considered to be an unused code. Likewise, for an amplitude-based metric, if $M^{CCH} > \tau$, or $m^{CCH} > \tau$, or $\tilde{M}^{CCH} > \tau$ the code is considered to be a used code, and, if not, considered to be an unused code. Note that two or more metrics may be compared to corresponding thresholds to make the decision, in some embodiments, where both must pass the threshold to be considered used.

If the code is detected to be used, this suggests that the code energy is sufficient to yield reliable symbol values, so that the symbols can be used as a "quasi-pilot." As a result, a covariance matrix can be computed for these codes, as shown in block 340. However, the channel estimates must be subtracted from the channel samples before correlating to get the covariance samples. A code-specific covariance matrix is therefore calculated as follows:

$$R_{cov}^{CCH}(f_1, f_2) = \frac{1}{N_s} \sum_{i=0}^{N_s - 1} \left( \hat{h}_{f_1}^{CCH}(i) - h_{f_1}^{CCH} \right) \left( \hat{h}_{f_2}^{CCH}(i) - h_{f_2}^{CCH} \right)^*. \qquad (14)$$

In this example expression, $1/N_S$ is a scaling factor that accounts for the number of symbols. It should be noted that in some embodiments, codes having various spreading factors (not just SF256) may be used, in which case another appropriate scaling factor may be used instead.

Further improvements to the estimation could be made if it can be determined or if it is otherwise known that a given finger has an estimate of the channel that lies outside of the power delay profile. In this case $h_{f_1}^{CCH}$ may be set to zero. Still another improvement is to average the $h_{f_1}^{CCH}$ across several different codes to get a better channel estimate. In this case, power-based scaling would also have to be applied to ensure the amplitude of the combined channel estimate is the same. One could also improve upon the individual $h_{f_1}^{CCH}$ by making sure only samples $\hat{h}_{f_1}^{CCH}(i)$ having phases within a certain angular range of $h_{f_1}^{CPICH}(i)$ are being used. In this way, outlying samples that disagree dramatically from the CPICH-based channel estimates are discarded. In addition to using these improved channel estimates in calculating the code-specific covariance matrix of Equation (14), these improved estimates could also be used in calculating combining weights, signal-quality metrics, etc., such as in Equations (2) and (3).

If a given code is detected to be unused, it is either truly unused or has low energy. In either case, the covariance samples between any two fingers $f_1$ and $f_2$ can be calculated as follows:

$$R_d^{CCH}(f_1, f_2) = \frac{1}{N_s} \sum_{i=0}^{N_s - 1} g_{f_1}^{CCH}(i) \left( g_{f_2}^{CCH}(i) \right)^*. \qquad (15)$$

Those skilled in the art will appreciate that these are simply correlations—thus, a covariance matrix $R_{cov}^{CCH}$ is computed for used codes (where the modulation and transmit diversity is known, so that reliable symbol values can be determined), while a correlation matrix $R_d^{CCH}$ is calculated instead for unused codes. Thus, block 345 of FIG. 3 illustrates that a correlation matrix is calculated for those codes determined to be unused.

It will be further appreciated that there may be a "gray zone" between those codes having sufficient energy to reliably demodulate and those codes that are truly unused. Thus, a further straight-forward embodiment is to apply any of the above metrics to two thresholds. For instance, it can be checked whether $M^{CCH} > \tau_1$ or $M^{CCH} < \tau_2$. In this embodiment, if neither test is passed, then the code is not used in the impairment estimation process at all. If the first test is passed, a covariance matrix is computed for the code. If the second test is passed, a correlation matrix is instead computed.

Once all codes in the first group have been evaluated, as indicated at block 350, the flow illustrated in FIG. 3 proceeds to block 380, where a final impairment covariance matrix is estimated. This operation will be described below, after the evaluation of codes having unknown modulation and/or unknown transmit-diversity schemes, as pictured on the right-hand side of FIG. 3.

Codes in this second group cannot be reliably demodulated as a general matter, even if they are actually used, because the modulation scheme and/or the transmit-diversity is unknown.

Thus, these codes are processed to determine which are truly unused, as correlation matrices can be calculated for the unused codes. This process begins, as shown at block 355, with a demodulation process. Like the demodulation process used in the processing of the first group of codes, combined de-spread symbol values can be obtained for codes of the second group according to:

$$\tilde{s}^{CCH}(i) = \sum_{f=0}^{N_f-1} (w_f^{CCH}(i))^* g_f^{CCH}(i), \quad (16)$$

where $w_f^{CCH}(i)$ are weights corresponding in time to the symbol to be demodulated. As noted earlier, several ways exist to select the weights, for example, they could be based on CPICH measurements, or a first enhancement iteration of the method or, if computational power is limited, of the previous time unit's equalizer weights for the HS-PDSCH.

One problem that arises for the second group of codes is where the transmit-diversity mode is not known. Several choices for proceeding are available. One approach is to separately apply all possible weights $w_f^{CCH}(i)$, reflecting each of the possible diversity modes, e.g., for each of: STTD (space-time transmit diversity); CL1 (Closed Loop Mode 1, which is defined in 3GPP Technical Specification TS 25.211); MIMO; no transmit diversity. With this approach four possible combined de-spread symbol values $\tilde{s}^{CCH}(i)$ are computed for time point i. This means that in the following step (illustrated at block 360), metrics are computed for each of the transmit-diversity modes. This may be the preferred approach if a fast decision as to whether a code is used is needed.

In an alternative approach, combined de-spread symbol values can be calculated using only combining weights corresponding to the no transmit-diversity mode. This is good enough if the aim is to discover whether a code is unused or not over a long time interval. The application of the no-transmit-diversity weights is good enough in this situation, since a transmission using transmit diversity will at least occasionally look like a no-transmit-diversity transmission, due to fading.

As shown at block 360, the combined de-spread symbol values are then used to calculate a metric τ. (Note that this metric may be of the same type as discussed in connection with block 330, but may also be of a different type.) As the transmit-diversity mode or the modulation applied, or both, are not known, using a SIR makes little sense, since the symbol values cannot be reliably detected. Therefore, in this case only the amplitude-based metric is considered.

Again, three different metrics falling into this group are shown below:

$$m^{CCH} = \frac{256}{SF_{CCH}} \sum_{i \in N_{valid}} |\tilde{s}^{CCH}(i)|. \quad (17)$$

$$M^{CCH} = \frac{m^{CCH}}{m^{CPICH}}. \quad (18)$$

$$\tilde{M}^{CCH} = \frac{m^{CCH}}{\sum_{\text{Sum over all involved codes}} m^{CCH}} \quad (19)$$

Note that $N_{valid}$ is the set of the usable symbols transmitted from the base station.

The first metric, given in Equation (17), measures the power of the observed code. In some embodiments, this metric may be used directly. In other embodiments, the second metric, which compares the power of the observed code to the power of the CPICH, is used instead. The third metric, given in Equation (19), computes the contribution of the observed code to the total observed power. Thus, it computes a ratio of the code power for the subject to the sum of all observed powers.

As shown at block 365, the metric is then compared to a threshold τ to determine whether the code in question is used or not. (This threshold may be the same as the threshold at block 335, in some embodiments, but may differ, in others.) For example, if $M^{CCH} > \tau$, or $m^{CCH} > \tau$, or $\tilde{M}^{CCH} > \tau$, then the code is considered to be a used code, and, if not, considered to be an unused code. Note that two or more metrics may be compared to corresponding thresholds to make the decision, in some embodiments, where both must pass the threshold to be considered used.

If several possible symbols are computed for a given code, based on different transmit-diversity assumptions, a metric for each such assumption may be computed and then the one with the maximum value is selected for comparison to the threshold τ. If, as suggested above, it is more interesting to know if a code is unused over a long period of time, rather than in a single slot, then the criteria $m^{CCH} > \tau$ should be fulfilled over at least $T_{unused}$ seconds (typically 1-2 seconds), or any similar statistical measure to determine the non-existence of power on the code.

If a code of this second group is determined to be used, it is discarded and the process proceeds at block 375. Since it cannot be reliably demodulated and detected, an accurate covariance matrix cannot be computed for this code. On the other hand, if the code is determined to be unused, a correlation matrix can be computed using, for example, Equation (17). This is shown at block 370.

Once all of the codes of the second group have been evaluated, as indicated at block 375, the process flow passes to the computation of a final covariance matrix, as shown at block 380. The correlation matrices and covariance matrices computed for any of the monitored codes can be combined with a covariance matrix computed for the CPICH, to yield a covariance matrix having reduced noise.

For instance, the covariances and correlations for each pair of fingers can be combined as follows:

$$R(f_1, f_2) = \quad (20)$$
$$\frac{1}{N_{CCH}} \Bigg( R_{cov}^{CPICH}(f_1, f_2) + \sum_{ch \in UsedCCH, group1} \alpha_{cov}^{CCH} R_{cov}^{CCH}(f_1, f_2) +$$
$$\sum_{ch \in UnusedCCH, group1} \alpha_d^{CCH} R_d^{CCH}(f_1, f_2)$$
$$\sum_{ch \in Subset\ of\ Group2} \alpha_d^{CCH} R_d^{CCH}(f_1, f_2) \Bigg)$$

where $N_{CCH}$ is the number of channels being used to calculate the enhance covariance matrix, including CPICH, and where $\alpha_d^{CCH}$ and $\alpha_{cov}^{CCH}$ are spreading factor dependent scaling factors. The output from this block is the enhanced covariance matrix R which can be used for weight calculations, usually after filtering, e.g., according to:

$$R_{filt}(t) = \lambda_{ccov}(R(t) - R_{filt}(t-1)) + R_{filt}(t-1). \quad (21)$$

This filtering process uses a filter facor $\lambda_{CCOV}$ that may be fixed, in a given receiver, or may depend on such factors as the channel characteristics, the level of interference, the velocity of the mobile station, etc.

The process illustrated in FIG. 3 is comprehensive in that it includes processing of three categories of codes or channels: used codes having known modulation schemes and known transmit diversity schemes; codes having known associated modulation schemes and transmit diversity schemes but that are apparently unused or of very low energy; and unused codes having unknown associated modulation schemes. Combining information obtaining from all three of these categories in the impairment estimation process improves the accuracy of the estimation as compared to an estimate based only on pilot channel observations.

Of course, it is not necessary for every embodiment of the invention to process all three categories of codes. Adding information obtained from one or two types of codes can reduce the noise in the estimation process and thus improve the accuracy of subsequent interference suppression.

Example processes that use only one or types of codes (in addition to the pilot channel) for estimating impairments are illustrated in FIGS. 4 and 5. In particular, the process illustrated in FIG. 4 addresses only those codes associated with known (or likely to be known) modulation schemes. This process distinguishes between those codes for which symbols can be reliably demodulation and those codes that are apparently unused. A covariance matrix is computed for those in the former category, while a correlation matrix is computed for those in the latter. FIG. 5, on the other hand, focuses only on codes associated with an unknown modulation scheme and/or unknown transmit-diversity scheme, and illustrates a process for determining that a code is unused. In this process, only unused codes are added to the impairment estimation process.

Referring first to FIG. 4, the illustrated method is for estimating impairment-related parameters of a received radio signal that includes a sequence of transmitted symbols. As discussed earlier, such a method may be implemented in a receiver having a plurality of processing-delay elements, such as a RAKE receiver (having a plurality of de-spreading "fingers") or a linear chip equalizer (having a plurality of delay taps). The illustrated method begins, as shown at block 410, with the computing of a quality metric, from samples of the received radio signal, for each of several codes for which an associated modulation scheme and an associated transmit diversity scheme (if any) are known. This group of codes is processed in addition to processing a common pilot. Thus, while the modulation scheme and transmit-diversity scheme are known, the associated transmitted symbol values are not known a priori.

The quality metric may be of any of several different types, as discussed earlier, including metrics based on symbol amplitudes or metrics based on an estimated signal-to-interference ratio (SIR) for the code. The latter will generally require a successful detection of the symbols transmitted on the code—in some embodiments the detection may be based on a so-called "hard decision," while in others a series of demodulated soft symbol values may be decoded, using a Viterbi or Turbo decoder, for example.

In some embodiments, the quality metric for each channelization code is computed by obtaining combined symbol values from the received radio signal, using the channelization code, the known transmit-diversity scheme, if any, and a predetermined set of combining weights applied to de-spread symbol values from the processing-delay elements, and calculating the quality metric as a function of the combined symbol values. As noted earlier, the predetermined set of combining weights may be derived in a number of ways, and may comprise weights obtained from a previous estimation of impairment based on a common pilot channel alone, or weights obtained from a previous iteration of impairment estimation based on one or more channelization codes, or weights obtained from a previous estimation of impairment from a prior transmission time interval.

In some cases, the quality metric is based on the sum of the amplitudes of the combined symbols scaled by a scaling factor dependent on a spreading factor for the channelization code. In other embodiments, the quality metric is based on the ratio of an intermediate metric based on the amplitudes of the combined symbols to a corresponding metric for a common pilot channel. This approach effectively normalizes the quality metric to a corresponding metric for the pilot channel. In still other embodiments, the contribution of a given code to the overall signal is evaluated. In some of these embodiments, the quality metric comprises the ratio of a metric based on the amplitudes of the combined symbols to the sum of corresponding metrics for all evaluated channelization codes.

As an alternative to these amplitude-based metrics, an SIR-based metric may be used, in some embodiments. In some of these embodiments, computing the quality metric further involves detecting discrete symbol values from the combined symbol values, using the known modulation scheme and one or more hard-decision thresholds, and computing code-specific per-delay channel estimates based on the discrete symbol values and per-delay symbol values for the channelization code. The quality metric can then be calculated as a function of a signal-to-interference ratio computed from the code-specific per-delay channel estimates. In some embodiments, the signal-to-interference ratio is computed from the code-specific channel estimates and preliminary combining weights used to form the combined symbol values. Once again, the preliminary combining weights can be obtained from any of several prior estimates of impairment, such as a previous estimation of impairment based on a common pilot channel alone, a previous iteration of impairment estimation based on one or more channelization codes other than the code used for the pilot channel, or a previous estimation of impairment from a prior transmission time interval.

As an alternative to detection by hard-decisions, some embodiments may detect symbol values by applying a convolutional or Turbo decoding process to the combined de-spread symbol values. In these embodiments, then, computing a quality metric requires decoding a sequence of the combined symbol values, according to the known modulation scheme and a pre-determined error-correction code, to obtain decoded symbol values, re-encoding the decoded symbol values to obtain re-encoded symbol values, and computing code-specific per-delay channel estimates based on the re-encoded symbol values and per-delay symbol values for the channelization code. The quality metric can then be calculated as a function of a signal-to-interference ratio computed from the code-specific channel estimates.

Whatever the quality metric used, the method continues, as illustrated at block 420, with determining that at least one of the channelization codes has a quality metric higher than a first threshold value and that at least one of the channelization codes has a quality metric lower than a second threshold value. In other words, at least one "used" code is identified, and at least one "unused" code is identified. The first and second threshold values may be the same, in some embodiments, but may differ in others. In the latter case, the first threshold value is typically higher than the second threshold value, allowing for a "gray zone" of codes for which it appears that there is enough energy present to suggest that the code is used, but for which there is insufficient energy to reliably decode the symbols and use those symbols as "quasi-pilot" symbols.

As indicated at block 430, a covariance matrix is computed for each of the channelization codes having a quality metric higher than the first threshold value (i.e., the used codes), using per-delay channel estimates calculated from per-delay de-spread symbol values at two or more processing delays and quasi-pilot symbol values obtained from combined per-delay de-spread symbol values. Examples of the detailed expressions for these calculations were provided above, in connection with the description of FIG. 3. In some embodiments, this computation involves obtaining combined symbol values from the received radio signal, using the channelization code, the known transmit-diversity scheme, if any, and a predetermined set of combining weights applied to de-spread symbol values from the processing-delay elements and detecting or decoding the quasi-pilot symbol values from the combined symbol values, using the hard-decision thresholds or the decoding/re-encoding techniques discussed above. Per-delay channel samples are then calculated from each quasi-pilot symbol value and the corresponding per-delay de-spread symbol values, and per-delay channel estimates are calculated, based on the per-delay channel samples. The covariance matrix is then computed from the per-delay channel estimates and the per-delay channel samples.

Likewise, as shown at block 440, a correlation matrix is computed for each of the channelization codes having a quality metric lower than the second threshold value (i.e., the unused codes), where each of the correlation matrices is computed directly from per-delay de-spread symbol values at two or more processing delays. Again, an example of the details of this calculation were provided earlier, in the description of FIG. 3.

Finally, as shown at block 450, an impairment covariance matrix for the received radio signal is calculated, e.g., using a weighted sum of the covariance matrices and correlation matrices. As discussed earlier, this impairment covariance matrix includes information obtained from observing the pilot symbols, but has reduced noise compared to an impairment covariance matrix computed only from pilot symbol observations.

FIG. 5, as noted above, illustrates a process for augmenting a pilot-based impairment estimation process with information obtained from unused codes, for which an associated modulation scheme and/or associated transmit-diversity scheme is unknown. In some embodiments, a process like that of FIG. 5 may be used alone, while in others, the techniques in FIG. 5 may be combined with those illustrated in FIG. 4.

In either case, the method illustrated in FIG. 5 is for estimating impairment-related parameters of a received radio signal that includes a sequence of transmitted symbols, and may be implemented in a receiver having a plurality of processing-delay elements, such as a RAKE receiver or a linear chip equalizer. The illustrated method begins, as shown at block 510, with the computing of a quality metric, from samples of the received radio signal, for each of a group of channelization codes for which either or both of an associated modulation scheme and associated transmit diversity scheme, if any, are not known. The quality metric may be any of several types, including those based on combined de-spread symbol amplitudes, described above. However, SIR-based metrics are less likely to be used, as reliably detecting transmitted symbol values is difficult, given that the correct transmit-diversity scheme and modulation scheme are difficult or impossible to ascertain.

As shown at block 520, the method continues with determining that at least one of the channelization codes has a quality metric lower than a threshold value. As shown at block 530, a correlation matrix is computed for each of the channelization codes having a quality metric lower than the threshold value, where each of the correlation matrices is computed directly from per-delay de-spread symbol values at two or more processing delays. Finally, as shown at block 540, an impairment covariance matrix for the received radio signal is calculated from the computed correlation matrices, e.g., by using a weighted sum.

In some embodiments, each of several possible transmit-diversity schemes is effectively tested during the computation of the quality metric. In some of these embodiments, a tentative quality metric corresponding to each of several candidate transmit diversity schemes is calculated by generating combined de-spread symbol values, using each candidate transmit diversity scheme and the plurality of processing-delay elements, and computing the tentative quality metric corresponding to each candidate transmit diversity scheme from the combined de-spread symbol values. In some of these embodiments, the tentative quality metric having the highest value is deemed to be the quality metric for the corresponding channelization code.

The techniques illustrated in FIGS. 3-5 and described above can be implemented in any of several types of receivers, including RAKE receivers and chip equalizer receivers. Typically, as noted earlier, these techniques will be performed at least in part using one or more microprocessors, microcontrollers, and the like, executing stored program code comprising instructions for carrying out one or more of the described methods. Of course, parts of a receiver configured according to these techniques, such as the RAKE fingers and chip-equalizer portions, may also be implemented using digital logic or other customized hardware. Accordingly, embodiments of the present invention include receivers having both programmable devices, with appropriate software, and special-purpose hardware. The general design of such devices is well known, and the applicability of the techniques described herein will be readily apparent to those skilled in the design of such devices. Accordingly, further description of the details of these devices is unnecessary, and is not provided herein.

Indeed, with the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method for estimating parameters of a received radio signal that includes a sequence of transmitted symbols, in a receiver having a plurality of processing-delay elements, the method comprising:

computing a quality metric of a first type, from samples of the received radio signal, for each of a first group of channelization codes for which an associated modulation scheme and an associated transmit diversity scheme, if any, are known, but for which the associated transmitted symbol values, if any, are unknown;

determining that at least one of the channelization codes of the first group has a quality metric higher than a first threshold value and that at least one of the channelization codes of the first group has a quality metric lower than a second threshold value;

computing a covariance matrix for each of the channelization codes of the first group having a quality metric higher than the first threshold value, using per-delay channel estimates calculated from per-delay de-spread symbol values at two or more processing delays and quasi-pilot symbol values obtained from combined per-delay de-spread symbol values;

computing a correlation matrix for each of the channelization codes of the first group having a quality metric lower than the second threshold value, wherein each of the correlation matrices is computed directly from per-delay de-spread symbol values at two or more processing delays; and calculating an impairment covariance matrix for the received radio signal from the computed covariance matrices and correlation matrices.

2. The method of claim 1, wherein the first second threshold value and the second threshold value are the same.

3. The method of claim 1, wherein one or more of the channelization codes of the first group correspond to control channels having constant transmit power over at least all but one symbol in a transmission slot.

4. The method of claim 1, wherein computing a quality metric of the first type for each channelization code of the first group comprises:

obtaining combined symbol values from the received radio signal, using the channelization code, the known transmit-diversity scheme, if any, and a predetermined set of combining weights applied to de-spread symbol values from the processing-delay elements; and calculating the quality metric as a function of the combined symbol values.

5. The method of claim 4, wherein the quality metric comprises a sum of the amplitudes of the combined symbols scaled by a scaling factor dependent on a spreading factor for the channelization code.

6. The method of claim 4, wherein the quality metric comprises a ratio of a metric based on the amplitudes of the combined symbols to a corresponding metric for a common pilot channel.

7. The method of claim 4, wherein the quality metric comprises a ratio of a metric based on the amplitudes of the combined symbols to a sum of corresponding metrics for all channelization codes of the first group.

8. The method of claim 4, wherein computing the quality metric of the first type for each channelization code of the first group comprises:

detecting discrete symbol values from the combined symbol values, using the known modulation scheme and one or more hard-decision thresholds; and computing code-specific per-delay channel estimates based on the discrete symbol values and per-delay symbol values for the channelization code; and calculating the quality metric as a function of a signal-to-interference ratio computed from the code-specific per-delay channel estimates.

9. The method of claim 8, wherein the signal-to-interference ratio is computed from the code-specific channel estimates and preliminary combining weights used to form the combined symbol values, wherein the preliminary combining weights are obtained from one of:

a previous estimation of impairment based on a common pilot channel alone;

a previous iteration of impairment estimation based on one or more channelization codes; and a previous estimation of impairment from a prior transmission time interval.

10. The method of claim 8, further comprising determining that one or more of the combined symbol values differs from any of a predetermined set of reference points by more than a predetermined distance or predetermined angle, and excluding the one or more of the combined symbol values from the quality metric calculation.

11. The method of claim 4, wherein computing a quality metric of the first type for each channelization code of the first group comprises:

decoding a sequence of the combined symbol values, according to the known modulation scheme and a predetermined error-correction code, to obtain decoded symbol values;

re-encoding the decoded symbol values to obtain re-encoded symbol values;

computing code-specific per-delay channel estimates based on the re-encoded symbol values and per-delay symbol values for the channelization code; and calculating the quality metric as a function of a signal-to-interference ratio computed from the code-specific channel estimates.

12. The method of claim 1, wherein computing the covariance matrix for each of the channelization codes of the first group having a quality metric higher than the first threshold value comprises:

obtaining combined symbol values from the received radio signal, using the channelization code, the known transmit-diversity scheme, if any, and a predetermined set of combining weights applied to de-spread symbol values from the processing-delay elements;

detecting the quasi-pilot symbol values from the combined symbol values, using the known modulation scheme and one or more hard-decision thresholds;

calculating per-delay channel samples from each quasi-pilot symbol value and the corresponding per-delay de-spread symbol values;

calculating per-delay channel estimates based on the per-delay channel samples; and calculating the covariance matrix from the per-delay channel estimates and the per-delay channel samples.

13. The method of claim 1, wherein computing the covariance matrix for each of the channelization codes of the first group having a quality metric higher than the first threshold value comprises:

obtaining combined symbol values from the received radio signal, using the channelization code, the known transmit-diversity scheme, if any, and a predetermined set of combining weights applied to de-spread symbol values from the processing-delay elements;

decoding a sequence of the combined symbol values, according to the known modulation scheme and a predetermined error-correction code, to obtain decoded symbol values;

re-encoding the decoded symbol values to obtain the quasi-pilot symbol values;

calculating per-delay channel samples from each quasi-pilot symbol value and the corresponding per-delay de-spread symbol values;

calculating per-delay channel estimates based on the per-delay channel samples; and calculating the covariance matrix from the per-delay channel estimates and the per-delay channel samples.

14. The method of claim 1, further comprising:

computing a quality metric of a second type, from samples of the received radio signal, for each of a second group of channelization codes for which either or both of an associated modulation scheme and associated transmit diversity scheme, if any, are not known;

determining that at least one of the channelization codes of the second group has a quality metric lower than a third threshold value; and computing a correlation matrix for each of the channelization codes of the second group having a quality metric lower than the third threshold value, wherein each of the correlation matrices is computed directly from per-delay de-spread symbol values at two or more processing delays;

wherein the impairment covariance matrix is further calculated from the correlation matrices computed for the second group.

15. The method of claim 14, further comprising, for each of the channelization codes of the second group for which the associated transmit diversity scheme, if any, is not known:

calculating a tentative quality metric corresponding to each of a plurality of candidate transmit diversity schemes, by generating combined de-spread symbol values, using each candidate transmit diversity scheme and the plurality of processing-delay elements, and computing the tentative quality metric corresponding to each candidate transmit diversity scheme from the combined de-spread symbol values; and selecting the tentative quality metric having the highest value to be the quality metric of the second type for the corresponding channelization code.

16. The method of claim 15, wherein computing the tentative quality metric for each channelization code of the second group and each of the candidate transmit diversity schemes comprises:

obtaining combined symbol values from the received radio signal, using the channelization code, the candidate transmit-diversity scheme, and a pre-determined set of combining weights applied to de-spread values obtained from the processing-delay elements; and calculating the quality metric as a function of the combined symbol values.

17. The method of claim 16, wherein the quality metric comprises a sum of the amplitudes of the combined symbols scaled by a scaling factor dependent on a spreading factor for the channelization code.

18. The method of claim 16, wherein the quality metric comprises a ratio of a metric based on the amplitudes of the combined symbols to a corresponding metric for a common pilot channel.

19. The method of claim 16, wherein the quality metric comprises a ratio of a metric based on the amplitudes of the combined symbols to a sum of corresponding metrics for all channelization codes of the second group.

20. The method of claim 14, wherein one or more of the channelization codes of the second group correspond to codes from a set of codes pre-determined to be unlikely to be used.

21. A wireless communication device comprising:

circuitry comprising a plurality of processing-delay elements and configured to receive a radio signal that includes a sequence of transmitted symbols, and a baseband processor circuit configured to:

compute a quality metric of a first type, from samples of the received radio signal, for each of a first group of channelization codes for which an associated modulation scheme and an associated transmit diversity scheme, if any, are known, but for which the associated transmitted symbol values, if any, are unknown;

determine that at least one of the channelization codes of the first group has a quality metric higher than a first threshold value and that at least one of the channelization codes of the first group has a quality metric lower than a second threshold value;

compute a covariance matrix for each of the channelization codes of the first group having a quality metric higher than the first threshold value, using per-delay channel estimates calculated from per-delay de-spread symbol values at two or more processing delays and quasi-pilot symbol values obtained from combined per-delay de-spread symbol values;

compute a correlation matrix for each of the channelization codes of the first group having a quality metric lower than the second threshold value, wherein each of the correlation matrices is computed directly from per-delay de-spread symbol values at two or more processing delays; and calculate an impairment covariance matrix for the received radio signal from the computed covariance matrices and correlation matrices.

22. The wireless communication device of claim 21, wherein the baseband processor circuit is configured to compute the quality metric of the first type for each channelization code of the first group by:

obtaining combined symbol values from the received radio signal, using the channelization code, the known transmit-diversity scheme, if any, and a predetermined set of combining weights applied to de-spread symbol values from the processing-delay elements; and calculating the quality metric as a function of the combined symbol values.

23. The wireless communication device of claim 22, wherein the baseband processor circuit is configured to compute the quality metric of the first type for each channelization code of the first group by:

detecting discrete symbol values from the combined symbol values, using the known modulation scheme and one or more hard-decision thresholds; and computing code-specific per-delay channel estimates based on the discrete symbol values and per-delay symbol values for the channelization code; and calculating the quality metric as a function of a signal-to-interference ratio computed from the code-specific per-delay channel estimates.

24. The wireless communication device of claim 23, wherein the baseband processor circuit is further configured to determine that one or more of the combined symbol values differs from any of a predetermined set of reference points by more than a predetermined distance or predetermined angle, and to exclude the one or more of the combined symbol values from the quality metric calculation.

25. The wireless communication device of claim 22, wherein the baseband processor circuit is configured to compute the quality metric of the first type for each channelization code of the first group by:

decoding a sequence of the combined symbol values, according to the known modulation scheme and a predetermined error-correction code, to obtain decoded symbol values;

re-encoding the decoded symbol values to obtain re-encoded symbol values;

computing code-specific per-delay channel estimates based on the re-encoded symbol values and per-delay symbol values for the channelization code; and calculating the quality metric as a function of a signal-to-interference ratio computed from the code-specific channel estimates.

26. The wireless communication device of claim 21, wherein the baseband processor circuit is further configured to:

compute a quality metric of a second type, from samples of the received radio signal, for each of a second group of channelization codes for which either or both of an associated modulation scheme and associated transmit diversity scheme, if any, are not known;

determine that at least one of the channelization codes of the second group has a quality metric lower than a third threshold value; and compute a correlation matrix for each of the channelization codes of the second group having a quality metric lower than the third threshold value, wherein each of the correlation matrices is computed directly from per-delay de-spread symbol values at two or more processing delays;

wherein the impairment covariance matrix is further calculated from the correlation matrices computed for the second group.

27. The wireless communication device of claim 26, wherein the baseband processor circuit is further configured to, for each of the channelization codes of the second group for which the associated transmit diversity scheme, if any, is not known:

calculate a tentative quality metric corresponding to each of a plurality of candidate transmit diversity schemes, by generating combined de-spread symbol values, using each candidate transmit diversity scheme and the plurality of processing-delay elements, and computing the tentative quality metric corresponding to each candidate transmit diversity scheme from the combined de-spread symbol values; and select the tentative quality metric having the highest value to be the quality metric of the second type for the corresponding channelization code.

* * * * *

UNITED STATES PATENT AND TRADEMARK OFFICE
CERTIFICATE OF CORRECTION

PATENT NO. : 8,582,624 B2
APPLICATION NO. : 12/976519
DATED : November 12, 2013
INVENTOR(S) : Jonsson et al.

It is certified that error appears in the above-identified patent and that said Letters Patent is hereby corrected as shown below:

On the Title Page, Item (75), under "Inventors", in Column 1, Line 3, delete "Jozefow" and insert -- Józefów --, therefor.

In the Specification

In Column 2, Line 33, delete "$(h_{f_1,s}-h_{f_1})(h_{f_2,s}-h_{f_2}),$" and insert -- $(h_{f_1,s}-h_{f_1})(h_{f_2,s}-h_{f_2})^*,$ --, therefor.

In Column 2, Line 51, delete "samples. $h_{fl,s}$." and insert -- samples, $h_{fl,s}$, --, therefor.

In Column 7, Line 1, delete "descried" and insert -- described --, therefor.

In Column 7, Line 46, delete "was" and insert -- w as --, therefor.

In Column 10, Line 53, delete "$(1/N_S-1)$" and insert -- $(1/N_S-1))$ --, therefor.

In Column 14, Line 15, delete "$M^{CCH} > \tau,$" and insert -- $\tilde{M}^{CCH} > \tau$ . --, therefor.

In Column 14, Line 54, in Equation (20), delete "$\sum_{ch \in UnusedCCH, group1} \alpha_d^{CCH} R_d^{CCH}(f_1, f_2)$" and insert -- $\sum_{ch \in UnusedCCH, group1} \alpha_d^{CCH} R_d^{CCH}(f_1, f_2)+$ --, therefor.

In the Claims

Signed and Sealed this
Twenty-second Day of April, 2014

Michelle K. Lee
*Deputy Director of the United States Patent and Trademark Office*

In Column 19, Lines 20-21, in Claim 4, delete "a quality metric" and insert -- the quality metric --, therefor.